US006132828A

United States Patent [19]

Yasui et al.

[11] Patent Number: 6,132,828

[45] Date of Patent: Oct. 17, 2000

[54] PLASTICS ENDLESS BELT FOR ELECTROPHOTOGRAPHY

[75] Inventors: Eiji Yasui; Tsukasa Fujita, both of Aichi, Japan

[73] Assignee: Tokai Rubber Industries, Ltd, Komaki, Japan

[21] Appl. No.: 08/942,697

[22] Filed: Sep. 29, 1997

[30] Foreign Application Priority Data

Mar. 7, 1997 [JP] Japan .................................... 9-178662

[51] Int. Cl.$^7$ ........................... B32B 27/30; B32B 27/32; B32B 27/36; G03G 15/14

[52] U.S. Cl. ...................... 428/36.91; 399/302; 399/308; 428/213; 428/332; 428/421; 428/447; 428/451; 428/475.8; 428/476.3

[58] Field of Search .................................... 399/302, 308; 428/421, 422, 336, 36.91, 213, 334, 447, 451, 475.8, 476.3, 332

[56] References Cited

U.S. PATENT DOCUMENTS

| | | | |
|---|---|---|---|
| 4,745,030 | 5/1988 | Arahara et al. | 428/421 |
| 4,948,690 | 8/1990 | Hisamura et al. | 430/60 |
| 5,393,467 | 2/1995 | Yabushita et al. | 252/511 |
| 5,530,532 | 6/1996 | Lino et al. | 399/237 |
| 5,572,304 | 11/1996 | Seto et al. | 399/313 |
| 5,702,824 | 12/1997 | Matsunaga et al. | 428/500 |
| 5,715,510 | 2/1998 | Kusaba et al. | 399/308 |
| 5,765,084 | 6/1998 | Asada et al. | 399/302 |
| 5,824,420 | 10/1998 | Dobashi et al. | 428/477 |

FOREIGN PATENT DOCUMENTS

| | | |
|---|---|---|
| 0 715 299 A1 | 11/1995 | European Pat. Off. . |
| 7-92825 | 4/1995 | Japan . |
| 8-110711 | 4/1996 | Japan . |

*Primary Examiner*—Paul Thibodeau
*Assistant Examiner*—Ramsey Zacharia
*Attorney, Agent, or Firm*—Armstrong, Westerman, Hattori, McLeland, and Naughton

[57] ABSTRACT

A plastics endless belt for electrophotography having a multilayer structure including a developing agent-supporting layer, wherein the developing agent-supporting layer comprises a material consisting essentially of a silicone resin or a material consisting essentially of a fluorine-modified acrylic resin, and a conductive agent is contained in at least one layer other than the developing agent-supporting layer.

25 Claims, 2 Drawing Sheets

PLASTICS ENDLESS BELT FOR ELECTROPHOTOGRAPHY

FIELD OF THE INVENTION

The present invention relates to a plastics endless belt for electrophotography which is used as a transfer intermediate body to copy a toner image on a photoreceptor in a device utilizing electrophotography such as a full-color copying machine or the like.

BACKGROUND OF THE INVENTION AND PRIOR ART

In these days, electrophotographic copying machines such as a full-color copying machine are in practical use. When transferring a toner image which is developed on a photoreceptor on to a sheet of paper, a process is employed of transferring the toner image on to the sheet of paper after the toner image is copied on a transfer intermediate body.

One example of the above is shown in FIG. 3. Namely, in this process, after the surface of a photosensitive drum 1 is charged by a charging roll 2, a slit exposure 4 of a light image of a subject copy reaches the surface of the photosensitive drum 1 through an exposure mechanism member 3. Thereafter, an electrostatic latent image which corresponds to the image of the subject copy is formed on the surface of the photosensitive drum 1, and a toner image is formed by supplying a developing agent by a developing apparatus 5. An endless belt 6, a transfer intermediate body, is contacted with pressure by a primary transfer roller 7 to the lower side of the photosensitive drum 1. The toner image developed on the photosensitive drum 1 is transferred, in a primary transfer, on to the surface of the endless belt 6 in the order of colors by repetitive forward and backward movements of the endless belt 6. Then, in a secondary transfer, the toner image is transferred on to a sheet of paper 9 which is put between the endless belt 6 and a secondary transfer roller 8 by the forward movements (which is the same direction of the photosensitive drum 1) of the endless belt 6. In the meantime, the developing agent remaining on the surface of the endless belt 6 after the secondary transfer is withdrawn by a cleaning blade 10, whereby the endless belt 6 is supposed to be ready for the next transfer. The developing agent remaining on the surface of the photosensitive drum 1 after the primary transfer is withdrawn by a cleaning apparatus 11, and the electricity of the surface of the photosensitive drum 1 then is removed by an eraser lamp 12.

Conventionally, the endless belt 6 has been formed from a conductive material in which polycarbonate (hereinafter, referred to as "PC") and a conductive agent such as carbon black, graphite and/or the like are melted and kneaded, and the volume resistivity thereof is adjusted. However, since the PC is inferior in flex fatigue resistance, cracks occur after long time use, resulting in the problem of poor durability. Moreover, since the PC is high in polarity, releasability of the toner image from the endless belt 6 (hereinafter, referred to as "toner releasability") becomes poor, and the developing agent sticks on the belt's surface with time, whereby causing a problem of a bad effect to images.

SUMMARY OF THE INVENTION

The present invention was made under such circumstances. It is an object of the present invention to provide a plastics endless belt for electrophotography which is excellent in toner releasability and durability and which may produce good images.

To accomplish the above object, the present invention provides a plastics endless belt for electrophotography having a multilayer structure including a developing agent-supporting layer, wherein the developing agent-supporting layer of the plastics endless belt comprises a material consisting essentially of a silicone resin or a material consisting essentially of a fluorine-modified acrylic resin, and an electrically conductive agent is contained in at least one layer other than the developing agent-supporting layer.

The inventors of the present invention complied a series of studies on a plastics endless belt for electrophotography (hereinafter, just abbreviated to "a plastics endless belt") which is excellent in toner releasability and durability and provides good images in a device utilizing electrophotography such as a full-color copying machine or the like. As a result, they found that, when the plastics endless belt is formed in a laminate structure of two layer or more, and the layer for supporting a developing agent (hereinafter, referred to as "a developing agent-supporting layer") of the plastics endless belt comprises a material consisting essentially of a silicone resin or a material consisting essentially of a fluorine-modified acrylic resin and the at least one layer other than the developing agent-supporting layer contains a conductive agent, the above object is accomplished. Thus, the inventors reached this invention. In the meantime, "to consist essentially of" in the present invention includes "to consist only of". The term "a developing agent" is for visualizing an electrostatic latent image, and is used as a general term in which toner, which is an image forming substance, and another substance, other than the toner, which is added if desired, are included.

DESCRIPTION OF THE PREFERRED EMBODIMENTS

Embodiments of the present invention will hereinafter be described.

Figure 1:
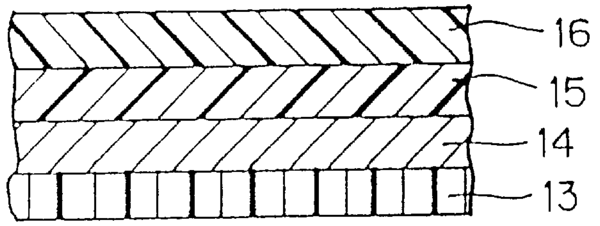
FIG. 1 is an explanatory view of one example of a plastics endless belt according to the present invention

A plastics endless belt according to present invention has, for example, as shown in FIG. 1, a four-layer structure of an inner layer 13, an intermediate layer 14 which is adjacent to the inner layer 13, an outer layer 15 which is adjacent to the intermediate layer 14 and a developing agent-supporting layer 16 which is adjacent to the outer layer 15.

Forming materials for the inner layer 13 are not limited. They may be fluororesins such as a vinylidene fluoride-tetrafluoroethylene copolymer (hereinafter, referred to as "Poly (VdF—TFE)"), an ethylene-tetrafluoroethylene copolymer (ETFE), polychlorotrifluoroethylene (PCTFE), a tetrafluoroethylene-hexafluoropropylene copolymer (FEP), a tetrafluoroethylene-perfluoroalkyl vinyl ether copolymer (PFA) and the like. Among those, the Poly (VdF—TFE), as a solvent-soluble fluororesin is preferable. Solvents for the solvent-soluble fluororesins include methyl ethyl ketone, acetone, methyl isobutyl ketone, toluene, ethyl acetate, tetrahydrofuran and the like.

Forming materials for the intermediate layer 14 which is formed adjacent to the inner layer 13 are not limited. They are, for example, polyamide resins such as N-methoxymethylated nylon (hereinafter, referred to as "nylon 8"), nylon 12, a polyamide copolymer and the like. Among those, nylon 8 is preferable for the purpose of improving adhesion strength between the inner layer 13 and the outer layer 15 and yet not mixing those two layers. Solvents for the above polyamide resins include single solvents such as methanol, ethanol and the like, mixed solvents in which water, toluene and/or the like are added to single-solvents, 1-propanol, 2-propanol and the like.

Forming materials for the outer layer 15 which is formed adjacent to the intermediate layer 14 are not limited. They may be the same fluororesins as those for the inner layer 13. The materials for the inner layer 13 and the outer layer 15 may be the same or different.

Forming material for the developing agent-supporting layer 16 which is formed adjacent to the outer layer 15 should be a material consisting essentially of a silicone resin or a material consisting essentially of a fluorine-modified acrylic resin. This is a main characteristic of the present invention. By forming the developing agent-supporting layer from a specific material, as mentioned above, toner releasability and durability may become good.

Moreover, it is preferable that pencil hardness of the developing agent-supporting layer 16 be B to 5H. Namely, with pencil hardness of less than B, the surface of the developing agent-supporting layer 36, that is, the surface of the resultant plastics endless belt is easily damaged, whereas, with pencil hardness of more than 5H, members which are to contact the plastics endless belt such as a photosensitive drum, a cleaning blade and the like are easily damaged. Pencil hardness is measured based on pencil scratch values according to Japanese Industrial Standard (JIS) K 5400.

The silicone resins are not limited. In general, liquid silicone resins are used in view of working efficiency. To further improve working efficiency, n-hexane and the like may be added. Among the liquid silicone resins, a hard type one-component or two-component setting silicone resin is preferable from the viewpoint of advantages in production. More preferably, they may be a heat setting silicone resin (methyl type), a room temperature setting silicone resin and the like. Meanwhile, a curing reaction of the room temperature setting silicone resin is shown in the following formula (1):

(1)

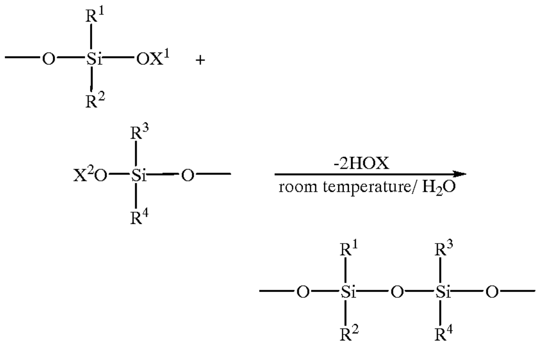

wherein $X^1$ and $X^2$, which are the same or different, represent $—CH_3$ or $—N{=}CR^5R^6$, and $R^1$, $R^2$, $R^3$, $R^4$, $R^5$ and $R^6$, which are the same or different, represent $—CH_3$,

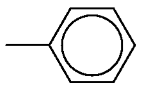

or H.

The fluorine-modified acrylic resins are not limited as long as some of hydrogen atoms or all the hydrogen atoms in the acrylic resins are replaced with fluorine atoms. For example, as disclosed in the Japanese Provisional Patent Publication No. 22820/95, page 2, the second column, lines 37 to page 13, the fluorine-modified acrylic resin is obtained by introducing a fluorinated organic group such as a perfluoroalkyl group with 1 to 20 carbon atoms or a partially-fluorinated alkyl group, optionally via an appropriate organic connecting group, to a side chain of the acrylic resin. A specific example of obtaining the fluorine-modified acrylic resin is to polymerize acrylate in which the fluorinated organic group is connected by the organic connecting group or methacrylate in which the fluorinated organic group is connected by the organic connecting group, and other acrylate. In particular, from the viewpoint of improving toner releasability and durability, a copolymer consisting essentially of a partially-fluorinated alkyl ester of an acrylic acid and methyl methacrylate is preferable. In this copolymer, the two elements are preferably contained at 15 to 100 weight % of the total copolymer. In order to further improve toner releasability, a polysiloxane group may be added to the fluorine-modified acrylic resin. Solvents for the fluorine-modified acrylic resins include ketones such as acetone, methyl ethyl ketone, methyl isobutyl ketone and the like, esters such as methyl acetate, butyl acetate and the like, polar solvents such as dimethylformamide, dimethyl sulfoxide and the like, halogen type solvents such as 1,1,1-trichloroethane, chloroform and the like, esters such as tetrahydrofuran, dioxane and the like, aromatics such as benzene, toluene, xylene and the like, and further fluorinated inert liquids such as perfluorooctane, perfluorotri-N-butylamine and the like. Among those, it is preferable to use acetone which is of reduced price and may easily be adjusted in terms of viscosity.

A conductive agent should be contained in at least one layer of the inner layer 13, the intermediate layer 14 and the outer layer 15, but not the developing agent-supporting layer 16. Namely, such leads to a god toner releasability and enhances images. For the conductive agents, there may be metallic powders such as aluminium powder, stainless steel powder and the like, conductive metal oxides such as c-ZnO, c-$TiO_2$, C-$ZnO_4$, c-$SnO_2$ and the like, conductive powders such as graphite, carbon black and the like, ionic conductive agents such as a quaternary ammonium salt, phosphate, sulfonate, aliphatic polyhydric alcohol, an aliphatic alcohol sulfate salt and the like. They may be used solely or in combination. Among those conductive agents, from the viewpoint of homogeneous dispersibility, the conductive metal oxides are preferable, and c-$TiO_2$ and c-$SnO_2$ are more preferable. Meanwhile, the above "c-" means conductive. If the conductive agent is contained in the developing agent-supporting layer 16, images are apt to deteriorate. Therefore, the developing agent-supporting layer 16 does not contain the conductive agent.

Fillers such as an antistatic agent, a cross linking agent and the like may appropriately be added to the inner layer 13, the intermediate layer 14, the outer layer 15 and/or the developing agent-supporting layer 16, if desired.

The above-described plastics endless belt may be manufactured, for example, in the following manner. First, forming materials for each of the layers 13, 14, 15 and 16 and their solvents are individually appropriately mixed, kneaded with a ball mill, a sand mill or the like and stirred, to prepare four separate coating liquids. At this point, the solvents for the forming materials of the adjacent layers are preferably different in order to form each layer with accuracy. Then, concentration of the thus prepared coating liquids are appropriately determined depending on the thicknesses of the layers. That is, viscosity adjustment of the coating liquids is a main factor to determine the thicknesses of the layers, and the viscosity is determined by the concentration of the coating liquids.

Figure 2:
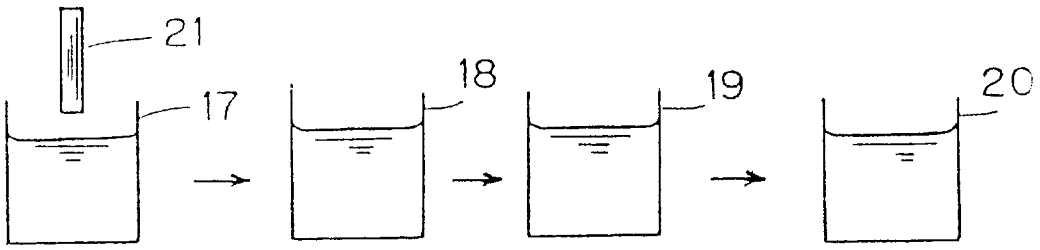
FIG. 2 is an explanatory view of a method of forming a plastics endless belt according to the present invention.
Figure 3:
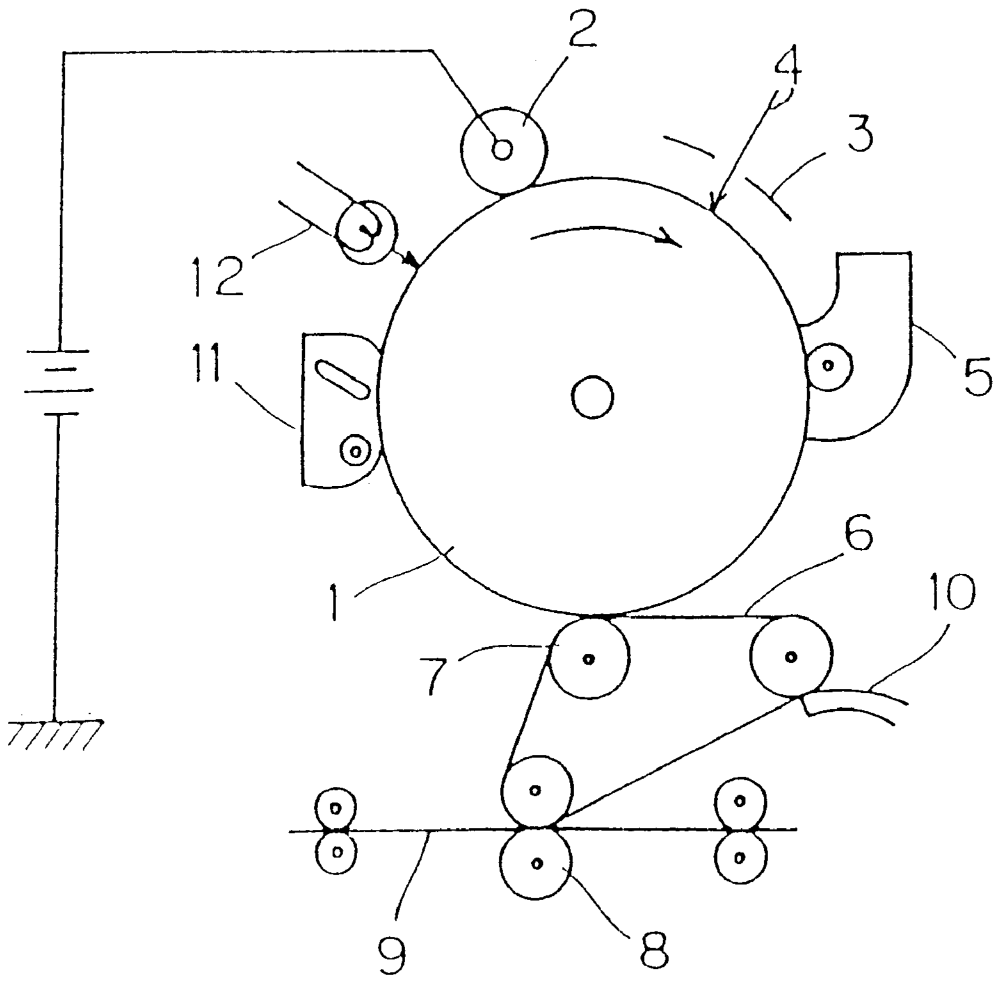
FIG. 3 is a diagrammatic representation of a copying mechanism of an electrophotographic copying machine.

Next, each of the coating liquids is poured into vessels 17, 18, 19 and 20 as shown in FIG. 2. In the meantime, an shaft body 21 made of metal (for example, aluminum, stainless steel and the like) is prepared and repeatedly soaked into the coating liquid in the vessel 17 while the shaft body 21 is held vertically. After pre-determined times of soak are repeated, the shaft body 21 is taken out from the coating liquid. Subsequently, same operations are repeated with each of the other coating liquids so as to form a four-layer structure. The four-layer structure then is dried and the solvents are removed therefrom. The structure thereafter is subjected to a heat treatment (for example, at 60 to 150° C. for 60 minutes) and the shaft body 21 is removed therefrom, whereby a plastics endless belt, a part of which is shown in FIG. 1, is obtained.

In addition to the above manufacturing method, a plastics endless belt according to the present invention may be obtained by an extrusion molding method, a spray coating method, an inflation method, a blow molding method or the like.

The thus obtained plastics endless belt has the developing agent-supporting layer 16 formed from a material consisting essentially of a silicone resin or a material consisting essentially of a fluorine-modified acrylic resin. At least one layer of the layers other than the developing agent-supporting layer 16 contains a conductive agent. For this reason, the plastics endless belt is excellent in toner releasability and durability. Therefore, when this plastics endless belt is used in the device utilizing electrophotography, high-quality images may be obtained.

In the plastics endless belt, it is preferable that the total thickness of the inner layer 13 and the outer layer 15 range from 50 to 200 $\mu$m. A more preferable range is from 100 to 150 $\mu$m. That is, if the thickness is below 50 $\mu$m, there is a fear of an insufficient strength, whereas, if the thickness exceeds 200 $\mu$m, there is a fear of an inferior flex fatigue resistance.

It is preferable that the thickness of the intermediate layer 14 range from 1 to 50 $\mu$m. A more preferable range is from 5 to 20 $\mu$m. That is, if the thickness is below 1 $\mu$m, there is a fear of a great change with time of electrical characteristics, whereas, if the thickness exceeds 50 $\mu$m, there is a fear of poor balance between strength and flexibility for the whole plastics endless belt.

The thickness of the developing agent-supporting layer 16 is preferably 0.2 to 30 $\mu$m, more preferably 1 to 10 $\mu$m. That is, if the thickness is below 0.2 $\mu$m, there is a fear of deterioration of toner releasability due to wear, whereas, if the thickness exceeds 30 $\mu$m, there is a fear of inferior flexibility and occurrence of cracks.

It is preferable that the plastics endless belt be 90 to 600 mm in inside peripheral length and about 100 to 500 mm in width. That is, the above size range is suitable for the plastics endless belts to be installed in an electrophotographic copying machine and the like.

In terms of properties of the plastics endless belt as a whole, it is preferable that its volume resistivity be determined at $10^6$ to $10^{14}$ Ω·cm. A more preferable range is from b $10^8$ to $10^{12}$ Ω·cm. That is, if the volume resistivity is below $10^6$ Ω·cm, there is a fear that electrical charge decreases too quickly and the capacity of a power source may have to be increased, whereas, if the volume resistivity exceeds $10^{14}$ Ω·cm, there is a fear that electrical charge decreases too slowly and a system for removing electricity may be required. Meanwhile, it is preferable that the surface resistivity of the plastics endless belt be determined at $10^6$ to $10^{14}$ Ω/cm. A more preferable range is from $10^8$ to $10^{14}$ Ω/cm. That is, if the surface resistivity is below $10^6$ Ω/cm, there is a fear that electrical charge decreases too quickly and the capacity of a power source may have to be increased, whereas, if the surface resistivity exceeds $10^{14}$ Ω/cm, there is a fear that electrical charge decreases too slowly and a system for removing electricity may be required. The volume resistivity and surface resistivity are measured based on resistivity test methods according to JIS K 6911.

Regarding the plastics endless belt according to the present invention, forming materials for the layers 13, 14 and 15 are not limited as long as the developing agent-supporting layer 16 is formed from a material consisting essentially of a silicone resin or a material consisting essentially of a fluorine-modified acrylic resin. For example, as the forming materials for the layers 13, 14 and 15, there may be a vinyl chloride type resin, an acrylonitrile-butadienestyrene resin, polymethyl methacrylate (PMMA), PC and the like.

Further, the plastics endless belt according to the present invention is not necessarily formed in a four-layer structure. It may be in a two or more-layer laminate structure having i) a developing agent-supporting layer, formed from a material consisting essentially of a silicone resin or a material consisting essentially of a fluorine-modified acrylic resin and ii) at least one other layer which contains a conductive agent.

Furthermore, the plastics endless belt according to the present invention is not limited to the uses as a transfer belt for an electrophotographic copying machine such as a full-color copying machine or the like. It may be used as a transfer belt for a monochrome electrophotographic copying machine. Still furthermore, the plastics endless belt according to the present invention may be used as a transfer belt for a printer, a facsimile or the like utilizing electrophotography.

The present invention will heretofore be explained by reference to Examples and Comparative Example.

Prior to conducting the Examples and the Comparative Example, coating liquids for forming an inner layer, an intermediate layer and an outer layer, respectively, were prepared.

Preparation of a Coating Liquid for Forming an Inner Layer

First, given amounts of solvent-soluble Poly (VdF—TFE) (Kyner SL, manufactured by Elf Atochem Japan) and c-$TiO_2$ (Titaniumblack 13M, manufactured by Mitsubishi Materials Corporation) were prepared. After the Poly (VdF—TFE) was dissolved in a given amount of acetone, c-$TiO_2$ was added thereto in such a manner that c-$TiO_2$ was 11 volume %. The mixture was stirred with a sand mill and dispersed, and a phosphate type antistatic agent was added thereto at a certain mixing ratio, whereby preparing a coating liquid for forming an inner layer having a certain viscosity.

Preparation of a Coating Liquid for Forming an Intermediate Layer

Subsequently, given amounts of a solvent-soluble polyamide resin (Tresin EF-30T, manufactured by Teikoku Chemical Industry Company Limited) and c-$SnO_2$ (Electro conductive powder T-1, manufactured by Mitsubishi Materials Corporation) were prepared. After the polyamide resin was dissolved in a given amount of a mixed solution of methanol and water (methanol/water=3/1), c-$SnO_2$ was added thereto in such a manner that c-$SnO_2$ was 60 weight % based on 100 weight % of the polyamide resin. The mixture was stirred with a sand mill and dispersed, whereby preparing a coating liquid for forming an intermediate layer having a certain viscosity.

With respect to a coating liquid for forming an outer layer, two kinds of coating liquids for forming an outer layer a and b were prepared.

Preparation of a Coating Liquid for Forming an Outer Layer a

First, given amounts of solvent-soluble Poly (VdF—TFE) (Kyner SL, manufactured by Elf Atochem Japan) and c-$TiO_2$ (Titaniumblack 13M, manufactured by Mitsubishi Materials Corporation) were prepared. After the Poly (VdF—TFE) was dissolved in a given amount of acetone, c-$TiO_2$ was added thereto in such a manner that c-$TiO_2$ was 11 volume %. The mixture was stirred with a sand mill and dispersed, whereby preparing a coating liquid for forming an outer layer having a certain viscosity.

Preparation of a Coating Liquid for Forming an Outer Layer b

Next, solvent-soluble Poly (VdF—TFE) (Kyner SL, manufactured by Elf Atochem Japan) was dissolved in a given amount of acetone, whereby preparing a coating liquid for an outer layer having a certain viscosity.

EXAMPLES 1–4

A forming material for a developing agent-supporting layer and its solvent were mixed in the mixing ratios shown in Table 1 below, and each coating liquid for the developing agent-supporting layer having a certain viscosity was prepared. The coating liquids for the layers which were prepared in the above-mentioned matter were poured into vessels, respectively (see FIG. 2). The kind of the coating liquids for the outer layer used is also shown in the Table. According to he above-mentioned method, an inner layer, an intermediate layer, an outer layer and a developing agent-supporting layer, in this order, were formed around an shaft body made of aluminum. The laminate was dried so as to remove the solvent and subjected to a heat treatment (at 60 to 150° C. for 60 minutes), whereby each layer was formed. Thereafter, the aluminum shaft body was removed and a required plastics endless belt thus was obtained. The thus obtained plastics endless belts were measured and evaluated in terms of thickness of each layer, pencil hardness of the developing agent-supporting layer, toner releasability, flex fatigue resistance and quality of the copied image. The results are shown in Table 2. Each measuring method is as follows.

Thickness

Thickness was measured by a micrometer.

Pencil Hardness

Pencil hardness was measured based on pencil scratch values according to JIS K 5400.

Toner Releasability

First, a developing agent was sprayed on the surface of a developing agent-supporting layer of a plastics endless belt. A rubber sheet then was placed on the developing agent-sprayed surface. The rubber sheet was loaded at 10 g/$cm^2$ at 80° C. for 30 minutes. When the rubber sheet was peeled off thereafter, the plastics endless belts in which the developing agent did not stick on the surface of the developing agent-supporting layer were marked with ○, while the plastics endless belts in which the developing agent stuck on the surface of the developing agent-supporting layer were marked with ×.

Flex Fatigue Resistance

With an MIT folding endurance test machine, a set sized specimen was folded repeatedly and reciprocation was measured until the specimen was cut.

Quality Evaluation of the Copied Image

The plastics endless belt was installed in a commercially-available color copying machine and the obtained copied image was evaluated. The copied images without degradation were marked with ○, while the copied images with degradation were marked with ×.

TABLE 1

| | | | Parts by weight Examples | | | |
|---|---|---|---|---|---|---|
| | | | 1 | 2 | 3 | 4 |
| Developing agent-supporting Layer | Resin | Silicon resin *1 | 100 | 100 | — | — |
| | | Fluorine-modified acrylic resin *2 | — | — | 100 | 100 |
| | Solvent | n-hexane | 400 | 400 | — | — |
| | | acetone | — | — | 400 | 400 |
| Kind of coating liquids for forming outer layer | | | a | b | a | b |

*1: Silicone SR2410, manufactured by Toray Dow Corning Company Limited.
*2: A copolymer consisting essentially of a partially-fluorinated alkyl ester of an acrylic acid (A) and methyl methacrylate (B) (the contained ratio of (A) and (B) is 75 weight % of the total copolymer).

TABLE 2

| | Examples | | | |
|---|---|---|---|---|
| | 1 | 2 | 3 | 4 |
| Thickness of inner layer (μm) | 70 | 70 | 70 | 70 |
| Thickness of intermediate layer (μm) | 10 | 10 | 10 | 10 |
| Thickness of outer layer (μm) | 70 | 70 | 70 | 70 |
| Thickness of developing agent-supporting layer (μm) | 1 | 1 | 1 | 1 |
| Pencil hardness of developing agent-supporting layer | 5H | 5H | 5H | 5H |
| Toner releasability | ○ | ○ | ○ | ○ |
| Flex fatigue resistance (Number of times of MIT test) | not less than 10000 times | | | |
| Quality of copied image | ○ | ○ | ○ | ○ |

EXAMPLES 5 AND 6

In Examples 5 and 6, the thickness of the developing agent-supporting layers were changed to be 0.2 μm and 30 μm, respectively. Except for those changes, the same procedure as in Example 1 was repeated to form plastics endless belts. The thus obtained plastics endless belts were measured and evaluated in the same manner as in Example 1. The results are shown in Table 3.

EXAMPLES 7 AND 8

As silicone resins for forming a developing agent-supporting layer, Silicone SR2411 (manufactured by Toray Dow Corning Silicone Company Limited) (Example 7) and Silicone SR2316 (manufactured by Toray Dow Corning Silicone Company Limited) (Example 8) were used. Except for those changes, the same procedure as in Example 1 was repeated to form plastics endless belts. The thus obtained plastics endless belts were measured and evaluated in the same manner as in Example 1. The results are also shown in Table 3.

EXAMPLES 9 AND 10

The total thicknesses of the inner layer and the outer layer were 50 $\mu$m (Example 9) and 200 $\mu$m (Example 10). Except for those changes, the same procedures as in Example 1 was repeated to form plastics endless belts. The thus obtained plastics endless belts were measured and evaluated in the same manner as in Example 1. The results are shown in Table 4.

EXAMPLES 11

The same procedure as in Example 1 was repeated, except that no outer layer was formed and the thickness of each layer was the thickness shown in Table 4 below, so as to form a plastics endless belt (of a three-layer structure). The thus obtained plastics endless belt was measured and evaluated in the same manner as in Example 1. The results are also shown in Table 4.

EXAMPLES 12

In this Example, the intermediate layer and the outer layer were not formed and the thicknesses of the rest of the layers were the thicknesses shown in Table 4 below. Except for those changes, the same procedure as in Example 1 was repeated to form a plastics endless belt (of a two-layer structure). The thus obtained plastics endless belt was measured and evaluated in the same manner as in Example 1. The results are also shown in Table 4.

COMPARATIVE EXAMPLE

Carbon black (Ketjenblack EC, manufactured by Ketjen Black International Company) was added to a polycarbonate resin so that the carbon black was 7.7 volume %. The mixture was melted and kneaded with a continuous kneading extruder (250° C.) so as to be pelletized, producing conductive material (volume resistivity: $5\times10^7$ Ω·cm). A plastics belt having a thickness of 150 $\mu$m then was formed, which was measured and evaluated in the same manner as in Example 1. The results are also shown in Table 4.

TABLE 3

| | Examples | | | |
|---|---|---|---|---|
| | 5 | 6 | 7 | 8 |
| Thickness of inner layer ($\mu$m) | 70 | 70 | 70 | 70 |
| Thickness of intermediate layer ($\mu$m) | 10 | 10 | 10 | 10 |
| Thickness of outer layer ($\mu$m) | 70 | 70 | 70 | 70 |
| Thickness of developing agent-supporting layer ($\mu$m) | 0.2 | 30 | 1 | 1 |
| Pencil hardness of developing agent-supporting layer | 5H | 5H | F | B |
| Toner releasability | ○ | ○ | ○ | ○ |
| Flex fatigue resistance (Number of times of MIT test) | not less than 10000 times | | | |
| Quality of copied image | ○ | ○ | ○ | ○ |

TABLE 4

| | Examples | | | | Comparative |
|---|---|---|---|---|---|
| | 9 | 10 | 11 | 12 | Example |
| Thickness of inner layer ($\mu$m) | 25 | 100 | 145 | 140 | |
| Thickness of intermediate layer ($\mu$m) | 10 | 10 | 15 | not formed | |
| Thickness of outer layer ($\mu$m) | 25 | 100 | not formed | | |
| Thickness of developing agent-supporting layer ($\mu$m) | 1 | 1 | 10 | 10 | |
| Pencil hardness of developing agent-supporting layer | 5H | 5H | H | H | |
| Toner releasability | ○ | ○ | ○ | ○ | X |
| Flex fatigue resistance (Number of times MIT test) | not less than 10000 times | | | | 60 times |
| Quality of copied image | ○ | ○ | ○ | ○ | X |

From the above results, the products of all the Examples are excellent in both toner releasability and flex fatigue resistance and provide the good-quality copied images. On the other hand, the product of the Comparative Example is inferior in toner releasability and flex fatigue resistance and further provides the poor-quality copied image.

EFFECT OF THE INVENTION

As mentioned heretofore, in the plastics endless belt according to the present invention, a developing agent-supporting layer is formed from a material consisting essentially of a silicone resin or a material consisting essentially of a fluorine-modified acrylic resin and at least one layer other than the developing agent-supporting layer contains a conductive agent, whereby realizing excellent toner releasability and durability. Consequently, when the plastics endless belt according to the present invention is installed in a device utilizing electrophotography, there is an advantage that high-quality images may be obtained.

What is claimed is:

1. A plastics endless belt for electrophotography having a multilayer structure including a developing agent-supporting layer, wherein the developing agent-supporting layer of the plastics endless belt comprises a material consisting essentially of a fluorine-modified acrylic resin, and an electrically conductive agent is contained in at least one layer other than the developing agent-supporting layer.

2. The plastics endless belt for electrophotography according to claim 1, wherein the fluorine-modified acrylic resin for forming the developing agent-supporting layer is a copolymer consisting essentially of a partially-fluorinated alkyl ester of an acrylic acid and methyl methacrylate.

3. The plastics endless belt for electrophotography according to claim 2, wherein pencil hardness of the developing agent-supporting layer is in the range from B to 5H.

4. The plastics endless belt for electrophotography according to claim 1, wherein the plastics endless belt has a four-layer structure comprising an inner layer, a first intermediate layer adjacent to the inner layer, a second intermediate layer adjacent to the first intermediate layer and a developing agent-supporting layer adjacent to the second intermediate layer, the inner layer being formed from a fluororesin material containing an electrically conductive agent, the first intermediate layer being formed from a polyamide resin material containing an electrically conductive agent and the second intermediate layer being formed from a fluororesin material.

5. The plastics endless belt for electrophotography according to claim 1, wherein the plastics endless belt has a four-layer structure comprising an inner layer, a first intermediate layer adjacent to the inner layer, a second intermediate layer adjacent to the first intermediate layer and a developing agent-supporting layer adjacent to the second intermediate layer, the inner layer being formed from a fluororesin material containing an electrically conductive agent, the first intermediate layer being formed from a polyamide resin material containing an electrically conductive agent and the second intermediate layer being formed from a fluororesin material, and the thickness of the developing agent-supporting layer is in the range from 0.2 to 30 $\mu$m.

6. The plastics endless belt for electrophotography according to claim 1, wherein the plastics endless belt has a four-layer structure comprising an inner layer, a first intermediate layer adjacent to the inner layer, a second intermediate layer adjacent to the first intermediate layer and a developing agent-supporting layer adjacent to the second intermediate layer, the inner layer being formed from a fluororesin material containing an electrically conductive agent, the first intermediate layer being formed from a polyamide resin material containing an electrically conductive agent and the second intermediate layer being formed from a fluororesin material, and pencil hardness of the developing agent-supporting layer is in the range from B to 5H.

7. The plastics endless belt for electrophotography according to claim 1, wherein the plastics endless belt has a four-layer structure comprising an inner layer, a first intermediate layer adjacent to the inner layer, a second intermediate layer adjacent to the first intermediate layer and a developing agent-supporting layer adjacent to the second intermediate layer, the inner layer being formed from a fluororesin material containing an electrically conductive agent, the first intermediate layer being formed from a polyamide resin material containing an electrically conductive agent, and the second intermediate layer being formed from a fluororesin material containing an electrically conductive agent.

8. The plastics endless belt for electrophotography according to claim 1, wherein the plastics endless belt has a four-structure comprising an inner-layer, a first intermediate layer adjacent to the inner layer, a second intermediate layer adjacent to the first intermediate layer and a developing agent-supporting layer adjacent to the second intermediate layer, the inner layer being formed from a fluororesin material containing an electrically conductive agent, the first intermediate layer being formed from a polyamide resin material containing an electrically conductive agent and the second intermediate layer being formed from a fluororesin material containing an electrically conductive agent, and a thickness of the developing agent-supporting layer is in the range from 0.2 to 30 $\mu$m.

9. The plastics endless belt for electrophotography according to claim 1, wherein the plastics endless belt has a four-layer structure comprising an inner layer, a first intermediate layer adjacent to the inner layer, a second intermediate layer adjacent to the first intermediate layer and a developing agent-supporting layer adjacent to the second intermediate layer, the inner layer being formed from a fluororesin material containing an electrically conductive agent, the first intermediate layer being formed from a polyamide resin material containing an electrically conductive agent and the second intermediate layer being formed from a fluororesin material containing an electrically conductive agent, and pencil hardness of the developing agent-supporting layer is in the range from B to 5H.

10. The plastics endless belt for electrophotography according to any of claims 4 to 9, wherein the combined thickness of the inner layer and the second intermediate layer is in the range from 50 to 200 $\mu$m.

11. The plastics endless belt for electrophotography according to claim 10, wherein the inner layer contains an antistatic agent.

12. The plastics endless belt for electrophotography according to any of claims 4 to 9, wherein the inner layer contains an antistatic agent.

13. The plastics endless belt for electrophotography according to any one of claims 4 to 9, wherein the electrically conductive agent is at least one selected from the group consisting of aluminum powder, stainless steel powder, c-ZnO, c-$TiO_2$, c-$ZnO_4$, c-$SnO_2$, graphite, carbon black, quaternary ammonium salts, phosphates, sulfonates, aliphatic polyhydric alcohols, and aliphatic alcohol sulfate salts.

14. The plastics endless belt for electrophotography according to claim 1, wherein the electrically conductive agent is at least one selected from the group consisting of aluminum powder, stainless steel powder, c-ZnO, c-$TiO_2$, c-$ZnO_4$, c-$SnO_2$, graphite, carbon black, quaternary ammonium salts, phosphates, sulfonates, aliphatic polyhydric alcohols, and aliphatic alcohol sulfate salts.

15. A plastics endless belt for electrophotography having a multilayer structure including a developing agent-supporting layer, wherein the plastics endless belt has a four-layer structure comprising an inner layer, a first intermediate layer adjacent to the inner layer, a second intermediate layer adjacent to the first intermediate layer and a developing agent-supporting layer adjacent to the second intermediate layer, the inner layer being formed from a fluororesin material containing an electrically conductive agent, the first intermediate layer being formed from a polyamide resin material containing an electrically conductive agent and the second intermediate layer being formed from a fluororesin material, and the developing agent-supporting layer of the plastics endless belt comprises a material consisting essentially of a silicone resin.

16. The plastics endless belt for electrophotography according to claim 15, wherein the thickness of the developing agent-supporting layer is in the range from 0.2 to 30 $\mu$m.

17. The plastics endless belt for electrophotography according to claim 15, wherein pencil hardness of the developing agent-supporting layer is in the range from B to 5H.

18. The plastics endless belt for electrophotography according to claim 15, wherein an electrically conductive agent is contained in the fluororesin material for forming the second intermediate layer.

19. The plastics endless belt for electrophotography according to claim 16, wherein an electrically conductive agent is contained in the fluororesin material for forming the second intermediate layer.

20. The plastics endless belt for electrophotography according to claim 17, wherein an electrically conductive agent is contained in the fluororesin material for forming the second intermediate layer.

21. The plastics endless belt for electrophotography according to any of claims 15 to 20, wherein the combined thickness of the inner layer and the second intermediate layer is in the range from 50 to 200 $\mu$m.

22. The plastics endless belt for electrophotography according to claim 21, wherein the inner layer contains an antistatic agent.

23. The plastics endless belt for electrophotography according to any of claims 15 to 20, wherein the inner layer contains an antistatic agent.

24. The plastics endless belt for electrophotography according to any of claims 18 to 20, wherein the electrically conductive agent is at least one selected from the group consisting of aluminum powder, stainless steel powder, c-ZnO, c-$TiO_2$, c-$ZnO_4$, c-$SnO_2$, graphite, carbon black, quaternary ammonium salts, phosphates, sulfonates, aliphatic polyhydric alcohols, and aliphatic alcohol sulfate salts.

25. The plastics endless belt for electrophotography according to claim 15, wherein the electrically conductive agent is at least one selected from the group consisting of aluminum powder, stainless steel powder, c-ZnO, c-$TiO_2$, c-$ZnO_4$, c-$SnO_2$, graphite, carbon black, quaternary ammonium salts, phosphates, sulfonates, aliphatic polyhydric alcohols, and aliphatic alcohol sulfate salts.

* * * * *